(12) United States Patent
Berben et al.

(10) Patent No.: US 8,727,563 B2
(45) Date of Patent: May 20, 2014

(54) LUMINESCENT DEVICE FOR THE CONVERSION OF PUMP LIGHT

(75) Inventors: Dirk Berben, Herdecke (DE); Ulrich Hartwig, Berlin (DE)

(73) Assignee: OSRAM GmbH, Munich (DE)

( * ) Notice: Subject to any disclaimer, the term of this patent is extended or adjusted under 35 U.S.C. 154(b) by 126 days.

(21) Appl. No.: 13/560,252

(22) Filed: Jul. 27, 2012

(65) Prior Publication Data

US 2013/0194777 A1    Aug. 1, 2013

(30) Foreign Application Priority Data

Jul. 27, 2011    (DE) .......................... 10 2011 079 907

(51) Int. Cl.
*F21V 9/16*    (2006.01)
*F21K 2/00*    (2006.01)

(52) U.S. Cl.
CPC ...................................... *F21K 2/00* (2013.01)
USPC ............. 362/231; 362/84; 362/317; 362/322; 257/98

(58) Field of Classification Search
CPC ........................................................ F21K 2/00
USPC .............. 362/84, 231, 317, 343, 322; 257/98, 257/100
See application file for complete search history.

(56) References Cited

U.S. PATENT DOCUMENTS 7,543,959 B2 *    6/2009   Bierhuizen et al. ........... 362/293
7,918,582 B2 *    4/2011   Curran et al. ................. 362/231

* cited by examiner

*Primary Examiner* — Ali Alavi
(74) *Attorney, Agent, or Firm* — Cozen O'Connor

(57) ABSTRACT

A luminescent device is disclosed comprising a luminescent substance for the conversion of pump light, wherein a scattering body which scatters the pump light is provided. The pump light input into the scattering body may first be scattered at inert scatterers provided in the scattering body and subsequently converted. Light scattered at luminescent particles may also be simultaneously converted.

17 Claims, 4 Drawing Sheets

LUMINESCENT DEVICE FOR THE CONVERSION OF PUMP LIGHT

RELATED APPLICATIONS

This application claims priority based on German Application NO. 102011079907.9 filed on Jul. 27, 2011, the disclosure content of which is hereby incorporated herein by reference.

FIELD OF THE INVENTION

The present invention relates to a luminescent device comprising a luminescent substance, which is provided for the conversion of pump light.

BACKGROUND OF THE INVENTION

High luminance light sources are employed in a very wide variety of fields, for instance in endoscopy as well as in projection apparatus, gas discharge lamps currently being the most widespread. The most recent developments in this field relate to the combination of a high power density light source, for instance a laser, with a luminescent element which converts pump light and is arranged at a distance from the pump light source. By means of the luminescent element, conversion of e.g. ultraviolet or blue pump light into longer wavelength converted light is carried out, during which a power loss emitted in the form of heat typically always occurs, for instance owing to the Stokes shift. For this reason, a luminescent element is often operated in reflection, i.e. the pump light is shone in in one direction and the converted light is emitted in the opposite direction, so that a heat sink can be provided on the rear side of the luminescent element.

SUMMARY OF THE INVENTION

One object of the present invention is to provide a luminescent device which is advantageous in comparison with the prior art. This object is achieved according to one aspect of the invention by a scattering body having an entry face for input of the pump light, scattering centers provided in its volume and an exit face for output of the converted light, wherein the scattering body is configured to scatter pump light, propagating in the scattering body in a principal propagation direction after input, which principal propagation direction makes an angle with the exit face of at most 30°, 25°, 20°, 15°, 10° or 5°, increasingly preferably in this order (and particularly preferably being parallel thereto), by means of the scattering centers in such a way that converted light passes through the exit face in a principal emission direction, the principal emission direction making an angle with the exit face of at least 60°, 65°, 70°, 75°, 80° or 85°, increasingly preferably in this order (and particularly preferably being perpendicular thereto).

In the preferred case, the principal propagation direction of the pump light is thus parallel to the exit face and the principal emission direction of the converted light is perpendicular thereto, i.e. the principal propagation direction and the principal emission direction are also mutually perpendicular; the scattering body therefore causes deviation of the light.

The surface provided for the exit of the converted light is not necessarily formed in a planar fashion, but may for example also extend in a curved fashion or comprise a substructure, for instance a microstructure having for example surface zones in the manner of a Fresnel lens. As an alternative and/or in addition, the surface may for example comprise an optical grating structure and/or further optical elements, for example microlenses or photonic grating structures. The angle relationship indicated for the principal emission direction and the exit face is then to be considered not in individual, for example inclined or tilted, surface regions, but instead for a linear approximation to the overall surface. In this context, the exit face is an idealized plane face linearly approximated to the actual surface; the exit face coincides in a section plane, containing the principal propagation and principal emission directions, with a straight line linearly approximated to the actual (for example microstructured) surface. If the surface provided for the exit of the pump light is formed in a planar fashion and is not substructured, it corresponds to the exit face.

In general, a scattering body according to the invention may be produced in two different (but not mutually exclusive) ways: on the one hand, a so-called inert scatterer may be provided for the scattering centers, which beyond the deviation (scattering) of the pump light does not interact therewith, i.e. in particular it does not change the wavelength of the pump light. The wavelength-converting luminescent substance would in this case be provided downstream of the scattering centers, for example as a surface layer of the scattering body, so that the conversion follows the scattering. The luminescent substance is nevertheless considered as a part of the scattering body in this case, a side of the luminescent layer facing away from the scattering centers forming the exit face of the scattering body.

On the other hand, it is also possible to provide luminescent particles as scattering centers, so that conversion of the pump light already takes place with the scattering, in which case a separate luminescent layer no longer necessarily has to be provided downstream of the scattering centers.

In the context of this disclosure, "scattering" thus very generally refers to an optical interaction of pump light with particles (scattering centers) which leads to light propagation in a direction different to the original direction. To this extent, the absorption of pump light by luminescent particles, with subsequent randomly distributed and therefore isotropic emission of converted light, also constitutes a scattering process. The exit face is then for example a correspondingly oriented surface of the volume in which the luminescent particles are embedded as scattering centers.

In both cases, the advantage over the prior art is obtained that, apart from the scattering centers, ideally no optical elements such as for instance lenses or mirrors need to be provided on the "rear side" of the luminescent substance, so that—although the luminescent substance is operated in transmission—a compact structure in relation to the principal emission direction is possible. Accordingly, for example, an illumination device containing the luminescent device can also be constructed more compactly, or a space otherwise provided on the rear side of the luminescent substance for pump light guiding can be utilized in another way, for instance for cooling purposes.

With a view to a compact structure of this type, a scattering body is also preferred whose extent in the principal emission direction is less than that in the principal propagation direction, and specifically is at most 75%, 50%, 40%, 30%, 25%, 20%, 15% or 10% thereof, increasingly preferably in this order. With a correspondingly "flatly" constructed scattering body, the space requirement in the principal emission direction can be optimized.

Operation of the luminescent substance in transmission is advantageous because, in contrast to a luminescent element operated in reflection, the optical path of the pump light and converted light do not coincide, i.e. the pump light is supplied on the "rear side" of the luminescent substance and the converted light is delivered on the "front side". This offers the advantage that optical elements can be provided in the path of the converted light, without the pump light thereby being influenced; specifically, it is thus possible for example to filter an unconverted pump light component out of the converted light when only converted light is intended to be provided in the application. If, conversely, as in the case of a luminescent element operated in reflection, the paths of the pump light and converted light coincide at least in the vicinity of the luminescent element, the pump light would also be attenuated or blocked by a corresponding filter. The paths would first need to be separated, which entails a certain degree of outlay and additional space requirement.

In general, both the principal propagation direction of the pump light and the principal emission direction of the converted light are respectively obtained as a centroid of propagation directions (of the pump light and converted light, respectively) weighted according to power, and the principal emission direction thus also constitutes a principal propagation direction, but that of the converted light (unless otherwise indicated, however, the term "principal propagation direction" refers to the pump light). For example, in the case of a surface formed in a planar fashion and emitting lambertianally converted light, the exit face would coincide therewith and the principal emission direction would correspond to the direction of the normal to the surface, or exit face.

Preferably, the principal emission direction is perpendicular to the exit face, although it may also make a different angle therewith in the scope of the angle ranges specified above (the smallest angle between the principal emission direction and the face is considered, not the angle between the surface normal and the principal emission direction). An emission direction not oriented perpendicularly to the exit face may, for example, result from aforementioned substructuring of the surface provided for the exit of the converted light—even though the emitted light is locally oriented perpendicularly to the surface, an angle different to 90° between the two may result from the averaging of the principal emission direction on the one hand and the linear approximation of the exit face on the other hand. The structure sizes of corresponding substructuring may, for example lie in a range of from a few hundred nanometers to a few millimeters; structuring in the micrometer range is typical.

The term "pump light" in the context of this disclosure firstly refers to electromagnetic radiation, which may for instance be emitted by a laser and the wavelength of which is not restricted to the visible range, i.e. it may for example also lie in the ultraviolet or infrared. On the other hand, "pump light" is also intended to cover corpuscular radiation, i.e. for example electron or ion radiation; laser radiation is, however, preferred.

Other preferred configurations are specified in the dependent claims and will be explained below; the individual features may also be essential to the invention in different combinations and they implicitly always relate both to the luminescent device and to an illumination device containing it, while not being restricted to the device category but also relating to aspects of production or use.

A first preferred embodiment relates to the luminescent particles already mentioned in the introduction, which are distributed in the scattering body as scattering centers. In contrast to the luminescent layer described in the context of the inert scatterers, the luminescent particles are embedded with for example a size of from a few hundred nanometers to a few micrometers in the scattering body, which thus constitutes a matrix holding the luminescent particles in position and in particular at a distance from one another. The average distance between neighboring luminescent particles may for example be at least 5 µm, and is at least 10 µm, 20 µm, 30 µm, 40 µm, 50 µm, 60 µm, 70 µm, 80 µm, 90 µm or 100 µm, increasingly preferably in this order, and is therefore significantly greater than the average spacing of luminescent particles preferably directly adjacent to one another in a luminescent element formed as a layer. These indications do not necessarily apply for the entire scattering body but, for example in the case of a density gradient which will be explained in more detail below, may only be satisfied in a section thereof; preferably, they are satisfied in a section of the scattering body dimensioned as at least 25%, 50% or 75% of the scattering body length taken in the principal propagation direction. Even though the luminescent particles thus also scatter the pump light in a luminescent layer referred to here as a luminescent element, in the context of the present disclosure only the luminescent particles separated from one another in the manner just described are termed as scattering centers and otherwise a luminescent element will be referred to.

The scattering centers differ from the particles of the luminescent element in so far as, owing to their arrangement, i.e. in particular owing to their distribution along the principal propagation direction, they actually also scatter the light (both pump light and converted light) laterally into a surface region, namely into that of the exit face. In the case of a luminescent element, on the other hand, any lateral face extending in the principal emission direction is negligibly small because the extent of the luminescent element in the principal emission direction at most 25%, 20%, 15%, 10% or 5%, increasingly preferably in this order, of an average value formed from its minimum and maximum extents perpendicularly to the principal emission direction.

A corresponding luminescent element, adjacent to the volume containing the scattering centers and referred to below as a "matrix" for the sake of simplicity, will preferably be provided in conjunction with inert scatterers. In a matrix consisting for example of glass, for instance titanium oxide and/or aluminum oxide particles with a size of from a few tens or hundreds of nm up to a few micrometers may thus be provided as scattering centers, in which case the average particle spacing may correspond for example to that indicated above for luminescent particles. Furthermore, for example, inclusions of a transparent material having a different refractive index to the matrix, for instance air inclusions, may also be provided as inert scatterers. Even though a luminescent element directly adjacent to the matrix is preferred, embodiments comprising an intermediate layer, for instance an immersion material, also should not be ruled out.

In this embodiment, the wavelength of the light when emerging from the matrix corresponds to that during input, i.e. the scattering merely leads to a direction change of the pump light subsequently converted in the luminescent element. In other words, this embodiment relates to a scattering body comprising a matrix which has an input face for the pump light input and inert scatterers provided as scattering centers in its volume, and a luminescent element whose side facing away from the matrix constitutes an exit face for the output of converted light; in this case, the matrix is configured to scatter pump light, propagating therein after the input in a principal propagation direction making an angle of at most 30° with the exit face, by means of the inert scatterers, in such a way that scattered pump light strikes the luminescent element, specifically on its opposite side, adjacent to the matrix (preferably directly adjacent thereto), from the exit face. The luminescent element thus operated in transmission then emits light converted at the exit face in a principal emission direction, specifically at an angle of at least 60° to the exit face; moreover, the angles specified in the context of the explanation of the main claim are also preferred here.

When reference is made to light propagation (pump light or converted light) in this disclosure, light propagation need not necessarily take place in order to implement the subject-matter, but rather the device merely needs to be configured correspondingly.

In another preferred embodiment, the scattering centers, i.e. inert scatterers and/or luminescent particles, are distributed nonuniformly in the scattering body, specifically with a density increasing in the principal propagation direction of the pump light. This does not necessarily apply over the entire length of the scattering body in the principal propagation direction, although it preferably does for a section thereof dimensioned as at least 25%, 50% or 75% of the scattering body length taken in the principal propagation direction. Owing to the density of scattering centers increasing in the principal propagation direction of the pump light, the scattering is correspondingly amplified so that, despite the pump light decreasing owing to the scattering which has already taken place, the scattered pump light quantity can be kept substantially constant. It is thus advantageously possible either to illuminate a luminescent element uniformly or to emit converted light uniformly from a matrix comprising luminescent particles.

In a preferred configuration, a filter nontransmissive for pump light is provided on the exit face. It is not necessarily entirely nontransmissive for the pump light, and may for example only affect a particular wavelength range or filter only a fraction of the amount of light at a particular wavelength. Such a filter downstream of the luminescent substance is preferably provided as a layer adjacent to the exit face, particularly preferably directly adjacent thereto.

Another embodiment relates to a scattering body comprising a reflection face which reflects the pump light in the direction of the principal propagation direction after input, so that pump light input obliquely with respect to the principal propagation direction then also propagates in the principal propagation direction. The pump light may for example be reflected by total reflection at a correspondingly oriented outer face of a scattering body having an increased refractive index relative to a surrounding medium, or alternatively at a mirrored face, which for instance a metal film, which allows greater freedom in the arrangement of a pump light source; even so, a compact structure is possible owing to the reflection face integrated into the scattering body.

In another preferred embodiment, a reflection face which at least partially reflects the pump light is provided on an opposite side of the scattering body from the exit face. This may, for example, likewise be formed as an externally applied metal film and, besides the pump light, may preferably also reflect the converted light. In general, isotropic scattering leads to light deviation equally in the direction of the exit face and in the opposite direction, and only about half of the pump light/converted light can therefore be utilized. By the reflection face on the opposite side from the exit face, a preferred direction is therefore defined and pump light initially scattered counter to the principal emission direction is kept in the matrix and reflected toward the exit face, which can significantly improve the efficiency. In general, the introduced pump light is scattered to at least 20%, 30%, 40%, 50%, 60%, 70%, 80% or 90%, increasingly preferably in this order; particularly preferably, all of the pump light is scattered.

In another preferred embodiment, a filter, preferably a filter layer, is provided on the entry face, for instance a bandpass filter essentially transmitting only the wavelength range required for the excitation of the luminescent substance. To this extent, an optical element provided for the pump light propagation is thus also integrated into the luminescent device, which can advantageously help to further reduce the space requirement outside the luminescent device.

The description of the scattering body has so far been restricted essentially to a section through it with a section plane containing both the principal propagation direction and the emission direction. Perpendicularly thereto, i.e. in the space direction, in the simplest case the luminescent device is constructed with translational symmetry.

In a preferred configuration, however, the scattering body is constructed with rotational symmetry and is configured to rotate about a rotation axis. In this case, two different scattering body geometries, which will be explained in more detail below as well as in the context of the exemplary embodiments, are possible in principle, namely an annular scattering body on the one hand and a tubular scattering body on the other hand.

In both cases, the axis of the rotational symmetry in the application then corresponds to a rotation axis of the scattering body; the annular body is thus configured as a rotating wheel and the tubular body as a rotating roller. In this case, the annular scattering body rotates with an emission direction parallel to the rotation axis and the tubular scattering body rotates with an emission direction perpendicular to the rotation axis—the parallel or perpendicular orientation is in this case the respectively particularly preferred case, the angles specified in the context of the main claim moreover being preferred. In other words, the "flat" ring is a consequence of the principal propagation direction lying (essentially) perpendicular to the rotation axis, and the "elongated" tube shape results from the principal propagation direction lying (essentially) parallel to the rotation axis.

In the application, the pump light is then preferably introduced at a location whose position is fixed relative to the rotation axis, i.e. this input location is positionally fixed in contrast to the rotating entry face. Owing to the rotation, a different region of luminescent substance is thus progressively excited, which is for example directly advantageous owing to the consequently reduced power loss per region of luminescent substance on average. On the other hand, the ring or the tube may also be subdivided into segments differing in terms of the luminescent substance, i.e. different colors may be assigned to the segments. In the case of a projection application, a micromirror array (DMD array) adapted to the rotation frequency may then for example reflect, or not reflect, the light of a particular color into the picture at each individual pixel, so that the image is obtained from color mixing as a time average.

To this extent, the rotational symmetry established above for the ring and tube is not necessarily satisfied for the entire structure, and segments may thus for example differ by luminescent substance as well as in terms of other features; for example, a layer filtering the pump light may also be additionally provided on the exit face for a green or red channel, while one may be absent for a blue or white channel. Here, the luminescent element operated in transmission becomes highly advantageous because post-processing of the converted light, for example by a filter layer provided on the exit face, can also be carried out segment- and to this extent channel-specifically, while, for instance in the case of a luminescent ring operated in reflection, it is necessary to provide a second light path for example for blue light or a filter wheel synchronized with the ring.

Preferably, the pump light propagation from one ring segment to a neighboring ring segment is at least restricted, and particularly preferably prevented. The segments could, for example, be separated from one another by a cut, for instance a microcut, in which case such cuts may furthermore be filled with an inert scatterer, for instance titanium oxide or aluminum oxide. By corresponding separation of the segments from one another, pump light propagation taking place in a rotation direction, i.e. in a circumferential direction, can be reduced or blocked so that in each case only the segment respectively illuminated with pump light is active, which can also help to reduce a "dirty" effect in the sense of undesired light generation.

In another preferred embodiment, a reflector is additionally provided, for instance in the form of an ellipsoid (and optionally half an ellipsoid) and the exit face is furthermore preferably arranged at a focal point of the reflector; the reflector may for example also have the shape of a parabola, i.e. it may be formed as a parabolic mirror. Space advantages can likewise be achieved in this case in respect of the aforementioned rotationally symmetrical structures owing to the scattering concept according to the invention—conversely, a luminescent element illuminated on the rear side by mirrors and a lens can only be placed in the ellipsoid with difficulty.

Although the pump light source employed is not intended to restrict the invention, and for example a light-emitting diode (LED) may also be envisioned as the pump light source, a laser is preferred for the pump light generation and the invention is also directed toward such an illumination device. The pump light source may in this case also be constructed from a multiplicity of excitation sources of equal and/or different emission wavelength which emit pump light. For example, pump light sources with a high power density can be produced in this way, for instance with a multiplicity of lasers.

Such an illumination device, or a luminescent device as explained above, can be used for a projection apparatus, a special effect lighting apparatus and/or an automobile headlamp.

BRIEF DESCRIPTION OF THE DRAWINGS

The invention will be explained in more detail below with the aid of exemplary embodiments.

DETAILED DESCRIPTION OF THE DRAWINGS

Figure 1:
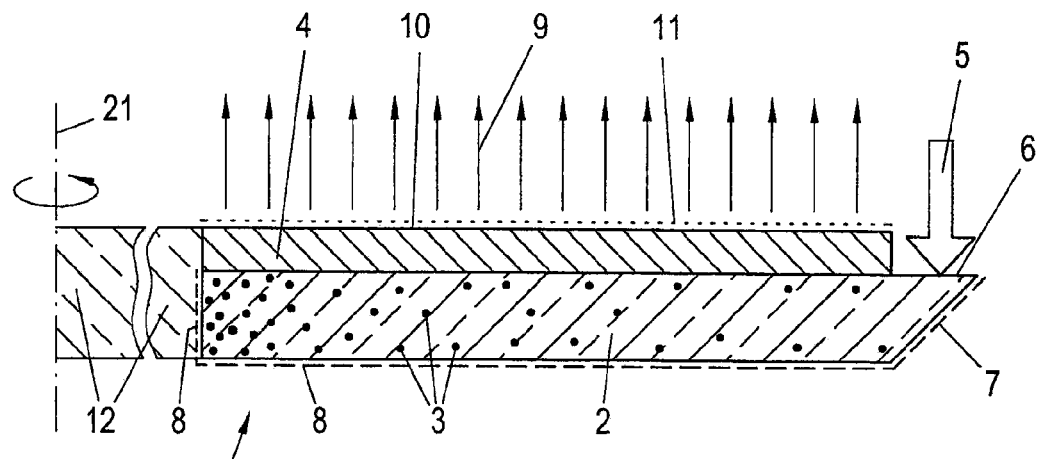
FIG. 1 shows a scattering body according to an embodiment of the invention comprising inert scatterers and a luminescent element.

FIG. 1 shows a scattering body 1 according to the invention in a section; the section plane, containing both the surface direction and the emission direction, lies in the plane of the drawing. The scattering body 1 comprises a matrix 2 with scattering centers 3 provided therein and a luminescent element 4 adjacent thereto.

A laser beam 5 can be input through an entry face 6 into the scattering body 1, i.e. initially into the matrix 2. After the input, the laser beam 5 is reflected at the wideband mirror 7, here applied as a metal layer, and then propagates in the principal propagation direction, horizontally from right to left in the present figure. In an idealized figurative case, without scattering centers, the laser light 5 would not leave a matrix 2 but would be kept in the matrix 2 by total reflection at the faces parallel to the principal propagation direction.

This is because a glass which transmits the laser light is provided for the matrix 2, but the pump light is scattered at the titanium oxide particles 3, the diameter of which lies in the range of a few hundred nanometers, embedded in the glass. The scattered light then has a direction component perpendicular to the principal propagation direction (and usually still a direction component in the principal propagation direction), no direction being preferred as a statistical average in terms of the orientation of the direction component perpendicular to the principal propagation direction, i.e. in this two-dimensional image the same amount of light is scattered "upward" and "downward".

For this reason, a layer 8 which reflects the pump light is provided on an opposite side of the matrix 2 from the luminescent element 4, and specifically again a wideband-reflecting metal mirror. As a result, either the pump light is scattered directly in the direction of the luminescent element 4, possibly also by means of a plurality of scattering centers 3, or it is scattered and then reflected in the direction of the luminescent element 4; owing to the scattering (also in combination with the reflection), the pump light then in all cases strikes the luminescent element 4 operated in transmission.

The luminescent substance, for instance a garnet luminescent substance of the form $A_xB_yC_zAl_5O_{12}$ (with A, B, C consisting of Y, Al, Lu, Ga etc.), for example Ce-doped YAG, an orthosilicate luminescent substance or pure nitride luminescent element, absorbs the pump light and reemits converted light 9 with lower energy and correspondingly a longer wavelength. A sufficiently small surface element of a surface of the luminescent element 4 on the opposite side from the matrix 2, which corresponds to the exit face 10, emits converted light into a hemisphere (adjoining the exit face via the section plane) so that a principal emission direction obtained as a centroid (of propagation directions weighted according to power) corresponds to a surface normal. Light emitted by the luminescent element 4 into the matrix 2 is (albeit with neglect of possible scattering for the sake of simplicity) reflected back by the wideband-reflecting metal mirror 8 in the direction of the luminescent element 4 and (again with neglect of scattering for the sake of simplicity) emitted through the exit face 10.

If, depending on the specific application, only converted light 9 is intended to be provided, a layer 11 which filters the pump light may be applied onto the luminescent element 4, a dichroic mirror advantageously reflecting the pump light back into the luminescent element 4 and thus making particularly efficient pump light utilization possible.

The scattering body 1 is closed on the left in FIG. 1 by a further wideband-reflecting layer, i.e. again a metal mirror, and adjoins a carrier 12 which will be explained in more detail below with the aid of FIG. 2.

Figure 2:
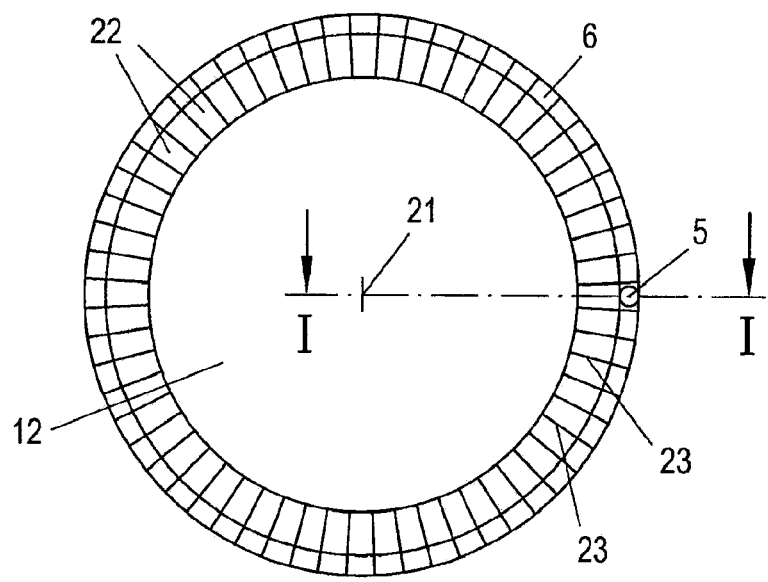
FIG. 2 illustrates an annular scattering body (constructed in section as explained with the aid of FIG. 1) in a plan view.

Specifically, FIG. 2 shows a plan view of the scattering body 1 discussed so far in section, and thus illustrates its extent in a direction perpendicular to the plane of the drawing of FIG. 1.

The scattering body 1 is formed with an annular shape and is configured for rotation about an axis 21 perpendicular to the plane of the drawing. The rotation axis 21 extends through the carrier 12 which, for example, is inserted into the annular scattering body 1 and may be connected thereto by a joint connection.

The annular scattering body 1 then rotates about the axis 21, the input of the laser beam 5 taking place at a location which is positionally fixed relative to the position of the axis 21. Accordingly, the luminescent element region illuminated by the pump light is progressively changed, which offers the advantages explained in the context of the dependent claims and, for instance in combination with a DMD array (and different colors), may be used for illumination in a projection apparatus.

The scattering body 1 can also be configured relatively compactly in relation to the radial direction, i.e. it may for example have an extent of less than one millimeter in this direction. On the other hand, the scattering body 1 may however also extend over centimeters or even decimeters in the radial direction.

FIGS. 1 and 2 illustrate a scattering body 1 formed with a ring shape, which adjoins the carrier 12. Furthermore, a multiplicity of correspondingly annular scattering bodies 1 may also be provided in cascade, i.e. interleaved with one another in relation to the radial direction (this is not shown).

In the embodiment represented in FIG. 2, the scattering body 1 is subdivided into a multiplicity of segments 22 which, for instance with a view to the projection applications just mentioned, may comprise luminescent elements 4 of different colors. In order to substantially restrict the luminescent substance excitation respectively to the segment 22 into which the pump light is introduced, in the ideal case, the segments 22 are separated from one another by radial microcuts 23 filled with titanium oxide. Pump light propagation extending beyond the individual segment 22 in the rotation direction can thus be reduced.

Figure 3:
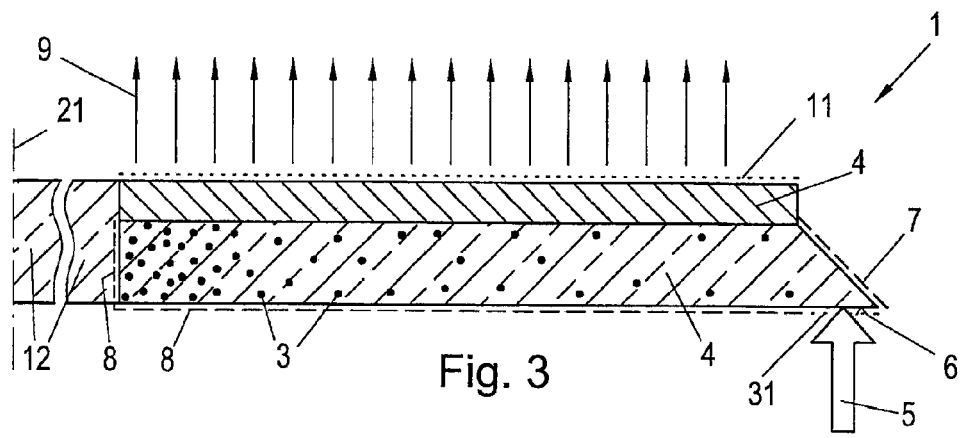
FIG. 3 shows a scattering body having an entry face arranged on the rear side for pump light input.
Figure 4:
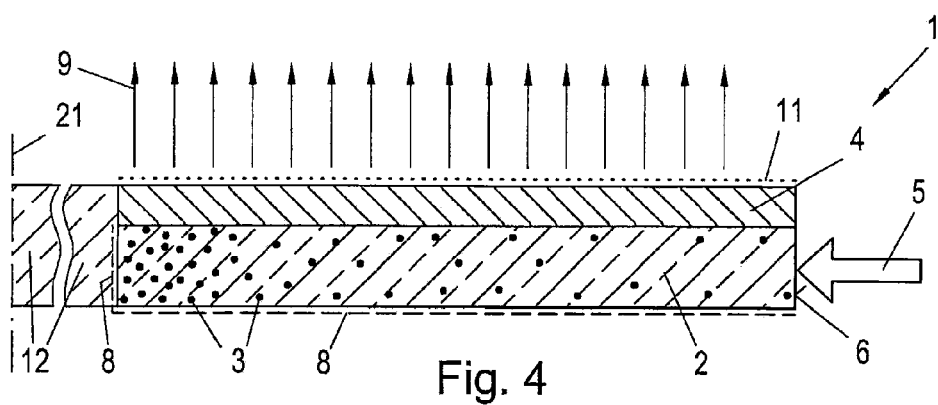
FIG. 4 illustrates a scattering body, otherwise constructed similarly to FIG. 3, in which the pump light is input laterally.

FIGS. 3 and 4 show a scattering body 1 which, in terms of the matrix 2 and luminescent element 4, is constructed similarly to the scattering body 1 explained with the aid of FIGS. 1 and 2. Furthermore, a layer 11 which filters the pump light out of the converted light 9 is again provided on the luminescent element 4.

The scattering bodies differ, however, by the orientation of the entry face. Thus, in the case of the scattering body 1 in FIG. 3, the entry face 6 is arranged on an opposite side from the luminescent element 4, i.e. on the rear side; the pump light 5, oriented in the principal emission direction before input (in contrast to FIG. 1), then nevertheless again propagates in the principal propagation direction after input and reflection at the mirror 7.

On the entry face 6 of the scattering body 1 according to FIG. 3, a filter layer 31 which transmits only the pump light 5 is furthermore provided.

In the case of the scattering body 1 shown in FIG. 4, the entry face 6 is already oriented perpendicularly to the principal propagation direction, and the laser beam 5 thus propagates in the principal propagation direction after input without deviation. In comparison, FIGS. 1, 3 and 4 show the flexibility which a scattering body 1 according to the invention offers in terms of the arrangement of the pump light source with respect to the luminescent element 4.

Figure 5:
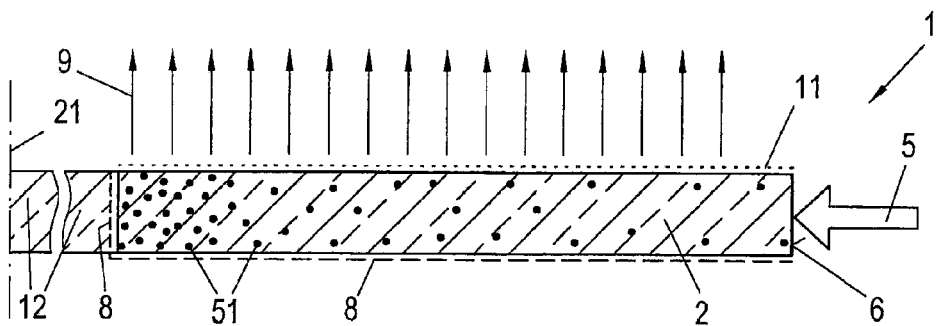
FIG. 5 shows a scattering body without a luminescent element, in which luminescent particles are embedded as scattering centers.

In the case of the scattering body 1 shown in FIG. 5, the entry face 6 is oriented according to the one in FIG. 4, and the pump light 5 is thus introduced laterally. In other regards, however, the scattering body 1 differs fundamentally from those discussed with the aid of the previous figures because in this case the luminescent substance is provided not in a luminescent layer 4 separated from the matrix 2, but instead in the form of luminescent particles 51 embedded in the matrix 2. The pump light propagating in the principal propagation direction is uniformly scattered from the principal propagation direction, as well as converted, by the luminescent particles 51.

Opposite a side of the matrix 2 provided as an exit face 10 for the converted light 9, in a similar way to the previous scattering bodies, a mirror 8 reflecting both pump light and converted light in a wide band is provided; at the exit face 10, a dichroic mirror 11 reflects unconverted pump light back into the matrix 2 but transmits the converted light 9.

With respect to the emission direction, the arrangements shown in FIGS. 1 to 5 can be made relatively thin, i.e. they may for example have a thickness in the millimeter or sub-millimeter range; on the other hand, thicknesses of from a few millimeters to centimeters are also possible.

Figure 6:
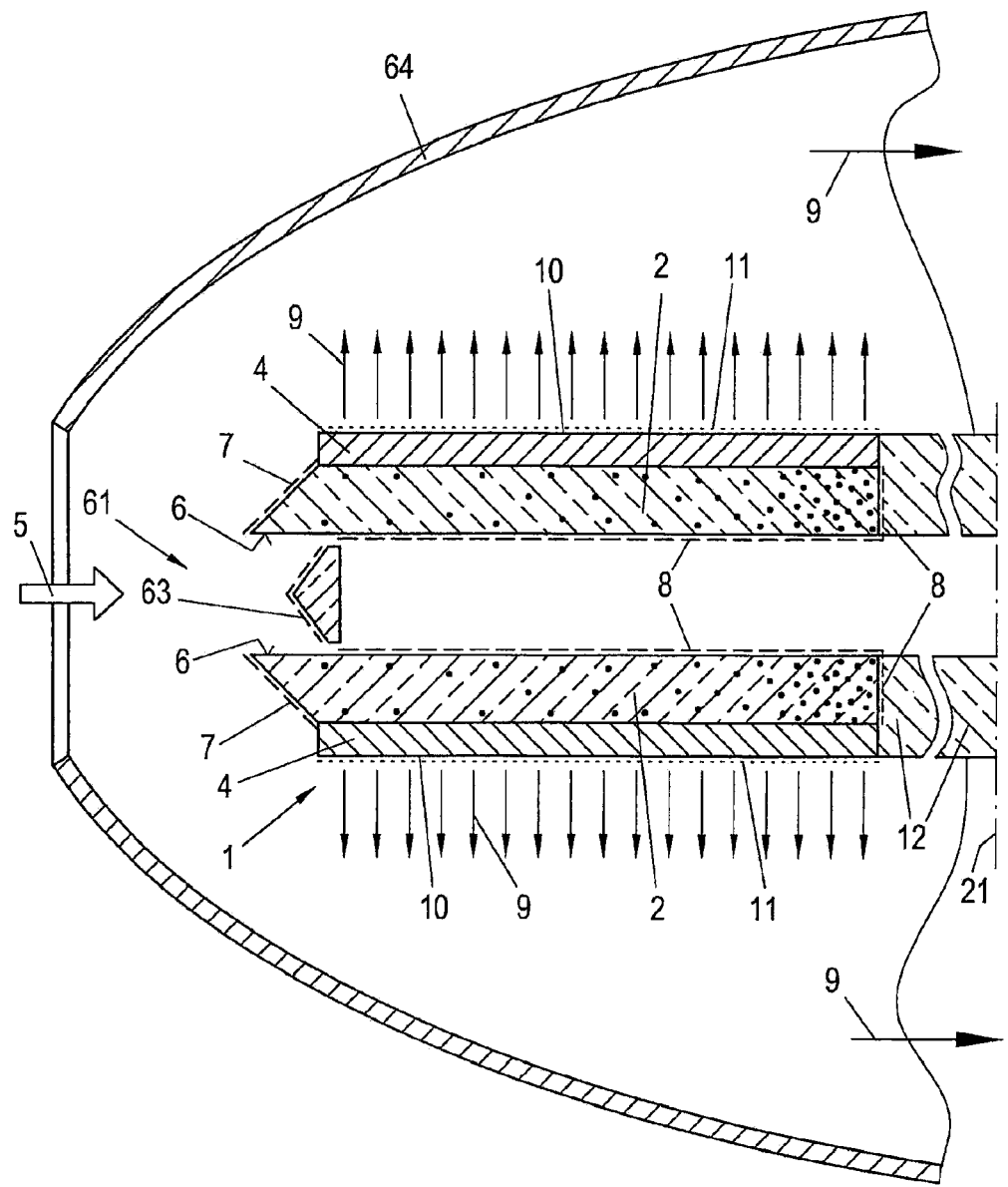
FIG. 6 illustrates an arrangement comprising two annular scattering bodies as explained with the aid of FIG. 2, which are arranged with a common rotation axis in a reflector.

FIG. 6 shows an arrangement composed of two scattering bodies explained with the aid of FIG. 3. The input of the pump light 5 takes place through an entry face 6 respectively arranged on the rear side, to which end the laser beam 5 is first split into two beams at the beam splitter 61, specifically by the beam striking a reflective reflection face 63 tapering to an edge at an angle. If the laser beam 5 strikes the edge centrally, pump light will be input in equal portions into the upper and lower scattering bodies 1; correspondingly, for example, by displacing the laser beam 5 in the vertical direction more pump light can respectively be delivered to one of the two scattering bodies 1. In this embodiment, for example, a plurality of excitation sources of different wavelength may also be provided as the pump light source so that, depending on the splitting of the pump light emitted by each individual excitation source, the scattering body 1 can be excited with a respectively different light mixture.

In the case of an aforementioned arrangement comprising cascaded scattering body rings, for instance, the beam splitter 61 may also be displaceable perpendicularly to the rotation axis 21. Furthermore, the beam splitter 61 may also be configured in parts, i.e. subdivided into an upper component and a lower component displaceable independently therefrom, the two components reflecting the light in opposite directions, i.e. to different scattering bodies 1.

The two scattering bodies 1 rotate about the common rotation axis 21, while emitting converted light 9 essentially restricted in each case in the manner described with the aid of FIG. 2 to an annular segment (shown here in section), and doing so in opposite directions.

A reflector 64 is furthermore provided in this arrangement, in order to send the converted light 9 collimated to an application. The reflector 64 is in this case constructed with mirror symmetry in relation to a plane extending, perpendicularly to the rotation axis 21, between the two scattering bodies 1 (the scattering bodies 1 are also arranged symmetrically with respect to this plane). Each of the reflector halves corresponds to half an ellipsoid of revolution, at the focal point of which an exit face 10 is respectively arranged.

Figure 7:
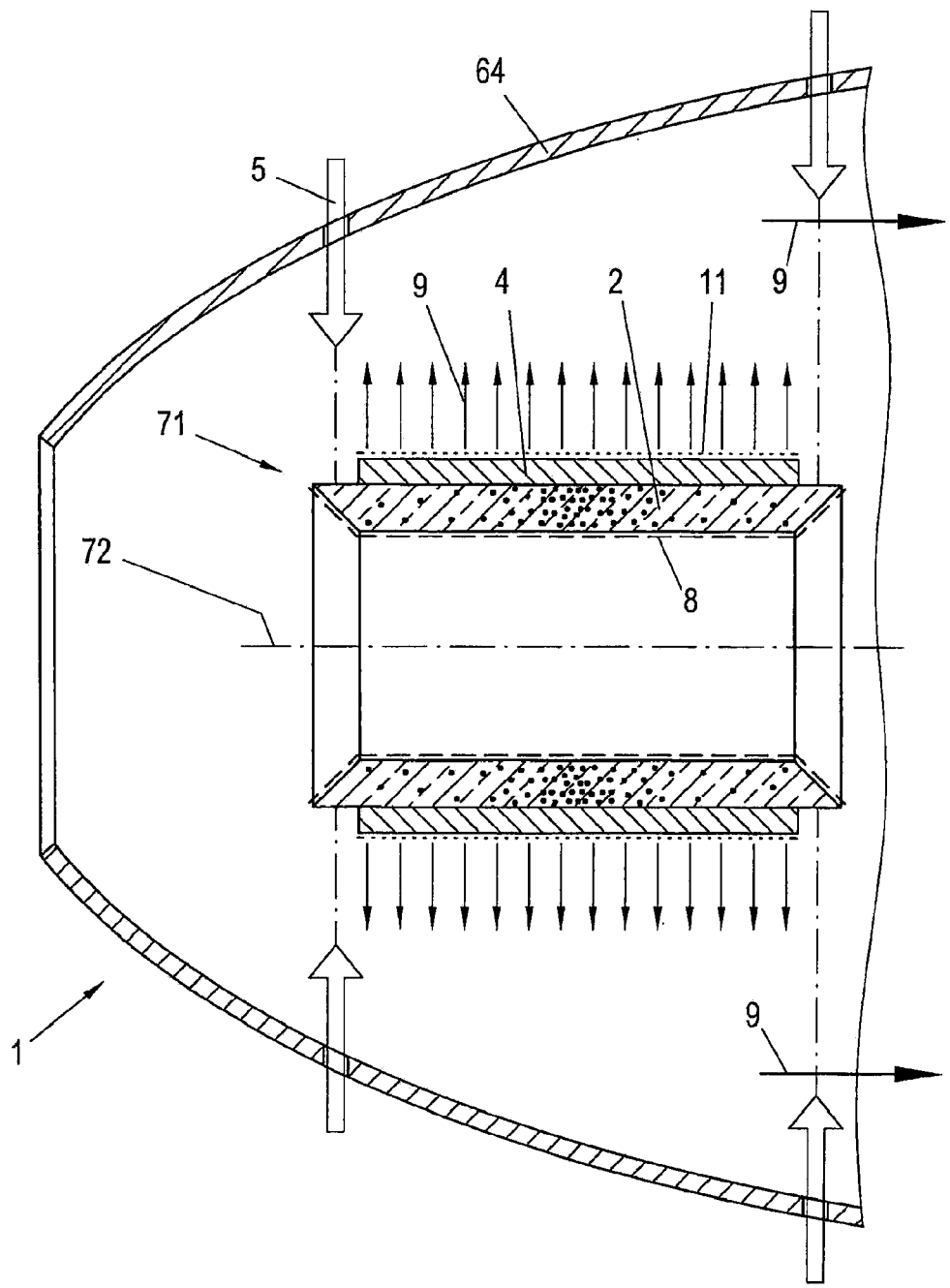
FIG. 7 likewise shows a scattering body in a reflector, the scattering body being formed with a tubular shape.

FIG. 7 shows a reflector 64, which is constructed in a comparable way but in which a tubular scattering body 71 is arranged, which rotates about its mid-axis 72. The scattering body 71 is rotated through 90° relative to the annular scattering bodies 1, i.e. it is aligned with its principal propagation direction parallel to the rotation axis 72.

The pump light 5 is brought into the reflector through openings provided for this purpose in the reflector 64 and input into the scattering body 71 through the entry face 6. The scattering body 71 is also constructed symmetrically with respect to a plane which is perpendicular to the rotation axis 72 and divides it centrally; a circumferential entry face 6 is thus respectively provided at both ends of the tube. Pump light 5 is however only input at the locations shown here in the section, and the respectively excited scattering body region is changed continuously by the rotation. The pump light propagating in the principal propagation direction is scattered in the manner described above at the embedded scattering particles (for example aluminum oxide, TiO2, rutile, etc.) in the direction of the luminescent element 4 (directly or by means of reflection at the metal layer 8 on the inner side of the tubular matrix 2 facing away from the luminescent substance). That segment of the likewise tubular luminescent element 4 which then emits converted light is in turn respectively arranged at a focal point of the reflector. The tubular body may be constructed relatively compactly in relation to the axial direction, i.e. it may have a length in the millimeter or submillimeter range; lengths in the centimeter or decimeter range are, however, also possible. In accordance with the exemplary embodiment mentioned above, a plurality of excitation light sources of equal or different emission wavelength may also be used individually or together here, in which case the excitation sources may emit pump light simultaneously or with a time offset, i.e. sequentially.

Owing to the tubular geometry of the scattering body 71, space is available inside it, in which for example a cooling device (for example a corotating rotor or a heat pipe) may be provided.

The invention claimed is:

1. A luminescent device, comprising:
a luminescent substance provided for the conversion of pump light into converted light; and
a scattering body having an entry face for input of the pump light, scattering centers provided in its volume and an exit face for output of the converted light,
wherein the scattering body is configured to scatter pump light, propagating in the scattering body after input in a principal propagation direction making an angle of at most 30° with the exit face, by said scattering centers, in such a way that converted light passes through the exit face in a principal emission direction at an angle of at least 60°.

2. The luminescent device as claimed in claim 1, wherein luminescent particles distributed in the scattering body volume are provided as said scattering centers.

3. The luminescent device as claimed in claim 1, wherein the scattering body comprises a luminescent element, which is adjacent to the volume containing the scattering centers and the side of which facing away from this interface with the volume corresponds to the exit face.

4. The luminescent device as claimed in claim 1, wherein the scattering centers are distributed nonuniformly in the scattering body.

5. The luminescent device as claimed in claim 1, wherein a filter which is at least partially nontransmissive for pump light is provided on the exit face.

6. The luminescent device as claimed in claim 1, wherein the scattering body has a reflection face, and the latter is configured to reflect the pump light after input into the scattering body, in such a way that the pump light propagation takes place in the principal propagation direction.

7. The luminescent device as claimed in claim 1, wherein a reflection layer which at least partially reflects the pump light is provided on an opposite side of the scattering body from the exit face.

8. The luminescent device as claimed in claim 1, wherein a filter is provided on the entry face.

9. The luminescent device as claimed in claim 1, wherein the scattering body is a body of revolution and is configured to rotate about a rotation axis.

10. The luminescent device as claimed in claim 9, wherein the body of revolution is subdivided in relation to a rotation direction into segments, which are configured so that the pump light propagation from one segment to a neighboring segment is at least restricted.

11. The luminescent device as claimed in claim 9, wherein the scattering body is formed as a ring, and the principal propagation direction of the pump light makes an angle of at least 60° with the rotation axis.

12. The luminescent device as claimed in claim 9, wherein the scattering body is formed in the shape of a tube, and the principal propagation direction of the pump light makes an angle of at most 30° with the rotation axis.

13. The luminescent device as claimed in claim 1, comprising a reflector, wherein the exit face is arranged at a focal point of the reflector.

14. An illumination device comprising a luminescent device as claimed in claim 1 and a laser, wherein pump light emitted by the laser is input into the scattering body through the entry face.

15. The luminescent device as claimed in claim 1, wherein the scattering centers are distributed nonuniformly in the scattering body, with a density increasing in the principal propagation direction of the pump light.

16. The luminescent device as claimed in claim 1, wherein a bandpass filter is provided on the entry face.

17. The luminescent device as claimed in claim 9, wherein the body of revolution is subdivided in relation to a rotation direction into segments, which are configured so that the pump light propagation from one segment to a neighboring segment is prevented.

* * * * *